(12) United States Patent
Thornton

(10) Patent No.: US 9,447,680 B2
(45) Date of Patent: Sep. 20, 2016

(54) SYSTEM AND METHOD FOR MATCHING LITHOLOGY RESPONSES OF DOWNHOLE TOOLS HAVING DIFFERENT SOURCE ENERGIES

(75) Inventor: James L. Thornton, East Windsor, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 719 days.

(21) Appl. No.: 13/143,904

(22) PCT Filed: Jan. 29, 2010

(86) PCT No.: PCT/US2010/022470
§ 371 (c)(1),
(2), (4) Date: Sep. 6, 2011

(87) PCT Pub. No.: WO2010/088439
PCT Pub. Date: Aug. 5, 2010

(65) Prior Publication Data
US 2011/0313669 A1 Dec. 22, 2011

Related U.S. Application Data

(60) Provisional application No. 61/148,595, filed on Jan. 30, 2009.

(51) Int. Cl.
*E21B 49/00* (2006.01)
*G01V 5/10* (2006.01)

(52) U.S. Cl.
CPC .............. *E21B 49/00* (2013.01); *G01V 5/108* (2013.01)

(58) Field of Classification Search
CPC ........ G01V 11/00; G01V 3/32; G01V 5/107; G01V 5/101; G01V 5/125; G01V 1/306; G01V 1/50; G01V 5/104; G01V 5/105; G01V 5/108; G01V 2210/626; G01V 2210/667; G01V 5/102; G01V 1/30; G01V 5/10; G01V 5/14; G01V 5/145; G01V 9/00; E21B 2041/0028; E21B 33/1243; E21B 43/26; E21B 49/008; E21B 49/06; E21B 49/10; E21B 47/00; E21B 47/024; E21B 47/082; E21B 49/00

USPC ...................................................... 702/8, 11
See application file for complete search history.

(56) References Cited

U.S. PATENT DOCUMENTS

| | | | |
|---|---|---|---|
| 4,760,252 A * | 7/1988 | Albats et al. ............. 250/390.07 |
| 5,789,752 A | 8/1998 | Mickael | |
| 6,032,102 A * | 2/2000 | Wijeyesekera et al. ........... 702/8 |
| 6,754,586 B1* | 6/2004 | Adolph et al. ..................... 702/8 |
| 6,884,994 B2 | 4/2005 | Simonetti et al. | |
| 7,112,783 B2 | 9/2006 | Ellis et al. | |
| 2003/0101011 A1* | 5/2003 | Odom ....................... G01N 9/24 702/78 |
| 2003/0213898 A1* | 11/2003 | Storm et al. ................ 250/269.3 |
| 2007/0057171 A1* | 3/2007 | Stoller et al. ................. 250/253 |
| 2011/0303836 A1 | 12/2011 | Gibson | |

* cited by examiner

*Primary Examiner* — Alexander Satanovsky
(74) *Attorney, Agent, or Firm* — Michael Dae

(57) ABSTRACT

Systems, methods, and devices for matching the lithology effect of a downhole tool having a lower-energy neutron source, such as AmBe, using a downhole tool having a higher-energy neutron source, such as an electronic neutron generator, are provided. One such downhole tool may include a neutron source, first and second neutron detectors, and data processing circuitry. The neutron source may emit neutrons into a subterranean formation, which may scatter off the formation. The first neutron detector may detect neutrons of a relatively lower spectrum of energies than the second neutron detector. From counts of these neutrons, the data processing circuitry may determine a property of the subterranean formation having a lithology effect that substantially matches another lithology effect associated with another downhole tool having a lower-energy neutron source.

20 Claims, 13 Drawing Sheets

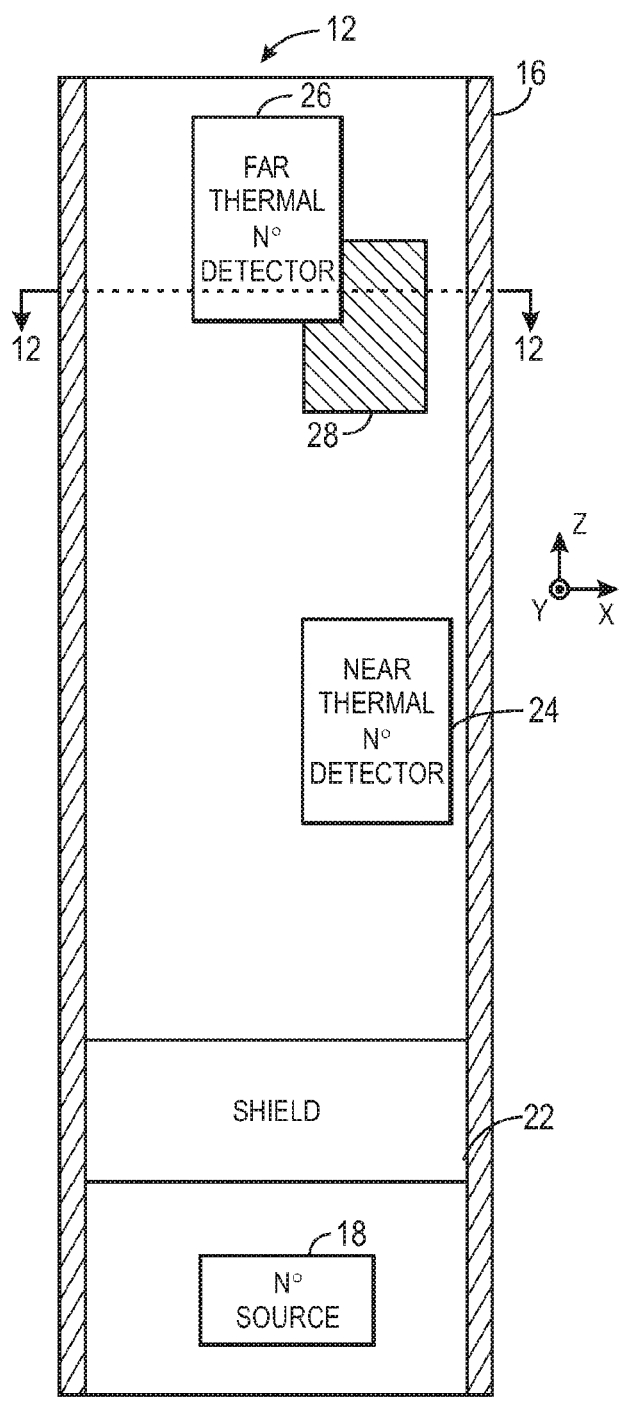
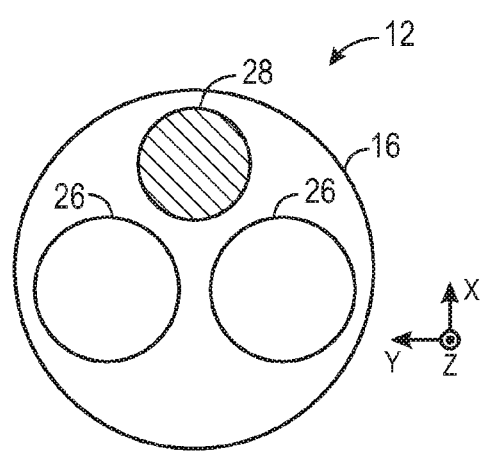
FIG. 11
FIG. 12

SYSTEM AND METHOD FOR MATCHING LITHOLOGY RESPONSES OF DOWNHOLE TOOLS HAVING DIFFERENT SOURCE ENERGIES

RELATED APPLICATIONS

This application claims the benefit of U.S. Provisional Application No. 61/148,595 filed on Jan. 30, 2009.

BACKGROUND

The present disclosure relates generally to thermal neutron logging tools and, more particularly, to matching the lithology response of thermal neutron logging tools having different source energies.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Thermal neutron logging devices have been used in the oil field for many years to measure formation porosity and other properties. These devices typically include a neutron source and a pair of thermal neutron detectors respectively located "near" and "far" relative to the neutron source. The neutron source may emit neutrons into a surrounding formation, which may scatter the neutrons and cause the neutrons to lose energy. Based on counts of these neutrons, thermal neutron logging devices may determine formation porosity and other properties because neutrons detected by a neutron detector placed not too close to the source may be largely dependent on the effect of elastic scattering on hydrogen nuclei in the formation. That is, the more hydrogen that is present in the formation, the fewer neutrons that arrive at such a neutron detector. Since formation porosity is generally water or hydrocarbon-filled, the count rate in the neutron detector may also be a measure of porosity. Because such devices may employ thermal neutron detectors, however, these devices may also be sensitive to the presence of thermal neutron absorbers in the subsurface environment. In particular, chlorine has a large capture cross section and saline fluids, of which chlorine is a component, are commonly encountered downhole. To reduce the sensitivity of such devices to this and other unwanted effects, the neutron porosity is typically derived from a ratio of count rates from the "near" neutron detector to the "far" neutron detector.

In addition to borehole fluids, many common downhole minerals may contain bound water or hydroxyls, so the hydrogen response of a thermal neutron logging device may not simply derive from porosity alone. Accordingly, while optimized for hydrogen sensitivity, thermal neutron logging devices may also have a residual sensitivity to other elements. This residual sensitivity to other elements may be referred to as the "lithology effect," defined as the apparent porosity that the device computes minus the apparent porosity that the device would compute if placed in a standard formation (generally taken to be calcite) with the same true porosity. To make explicit these departures from a true porosity reading, the measurement of such a thermal neutron logging device has come to be called "thermal neutron porosity." While these departures may appear to be a shortcoming of the measurement, over the years, a substantial body of experience has accumulated on the profitable use of these differences (e.g., as an indicator of lithology and in particular shale in the formation). These measurements may also be used in a comparison mode, where the correctness of the porosity reading may be less important than its consistency from well to well and over time.

Historically, thermal neutron porosity devices have typically employed an AmBe radioisotopic neutron source, which emits neutrons of a range of energies with an average value of around 4 MeV. For a variety of reasons, it would be very desirable to replace radioisotopic neutron sources with electronically-controlled neutron generators. Such neutron generators have been available for many years, many of which may emit 14 MeV neutrons based on deuterium-tritium (d-T) reactions. If a neutron generator is used in place of an AmBe neutron source in a thermal neutron porosity device, the differences in neutron source energy may substantially modify the response of the device to various downhole materials. For example, in addition to elastic neutron scattering, neutrons above 1 MeV may encounter a number of isotope-specific inelastic neutron reactions. Moreover, for a thermal neutron porosity device employing a 14 MeV neutron source, the contribution of these reactions to the total neutron response may be much larger than for a similar device employing a 4 MeV neutron source. If a thermal neutron device employing a 14 MeV neutron source were intended only to measure porosity, these differences could be accounted for in the device design, but since the neutron source energy of an electronic neutron generator differs substantially with that of AmBe source, substantial differences in the lithology response may also result.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for matching the lithology effect of a downhole tool having a lower-energy neutron source, such as AmBe, using a downhole tool having a higher-energy neutron source, such as an electronic neutron generator. These embodiments may generally rely on measuring scattered neutrons using at least two neutron detectors, one of which may on average detect higher-energy neutrons and one of which may on average detect lower-energy neutrons. According to one embodiment, a downhole tool may include a neutron source, first and second neutron detectors, and data processing circuitry. The neutron source may emit neutrons into a subterranean formation, which may scatter off the formation. The first neutron detector may detect neutrons of a relatively lower spectrum of energies than the second neutron detector. From counts of these neutrons, the data processing circuitry may determine a property of the subterranean formation having a lithology effect that substantially matches another lithology effect associated with another downhole tool having a lower-energy neutron source.

BRIEF DESCRIPTION OF THE DRAWINGS

Various aspects of this disclosure may be better understood upon reading the following detailed description and upon reference to the drawings in which:

FIGS. 6-14 are schematic diagrams of downhole tools that may employ the techniques described herein, in accordance with embodiments.

DETAILED DESCRIPTION OF SPECIFIC EMBODIMENTS

Figure 1:
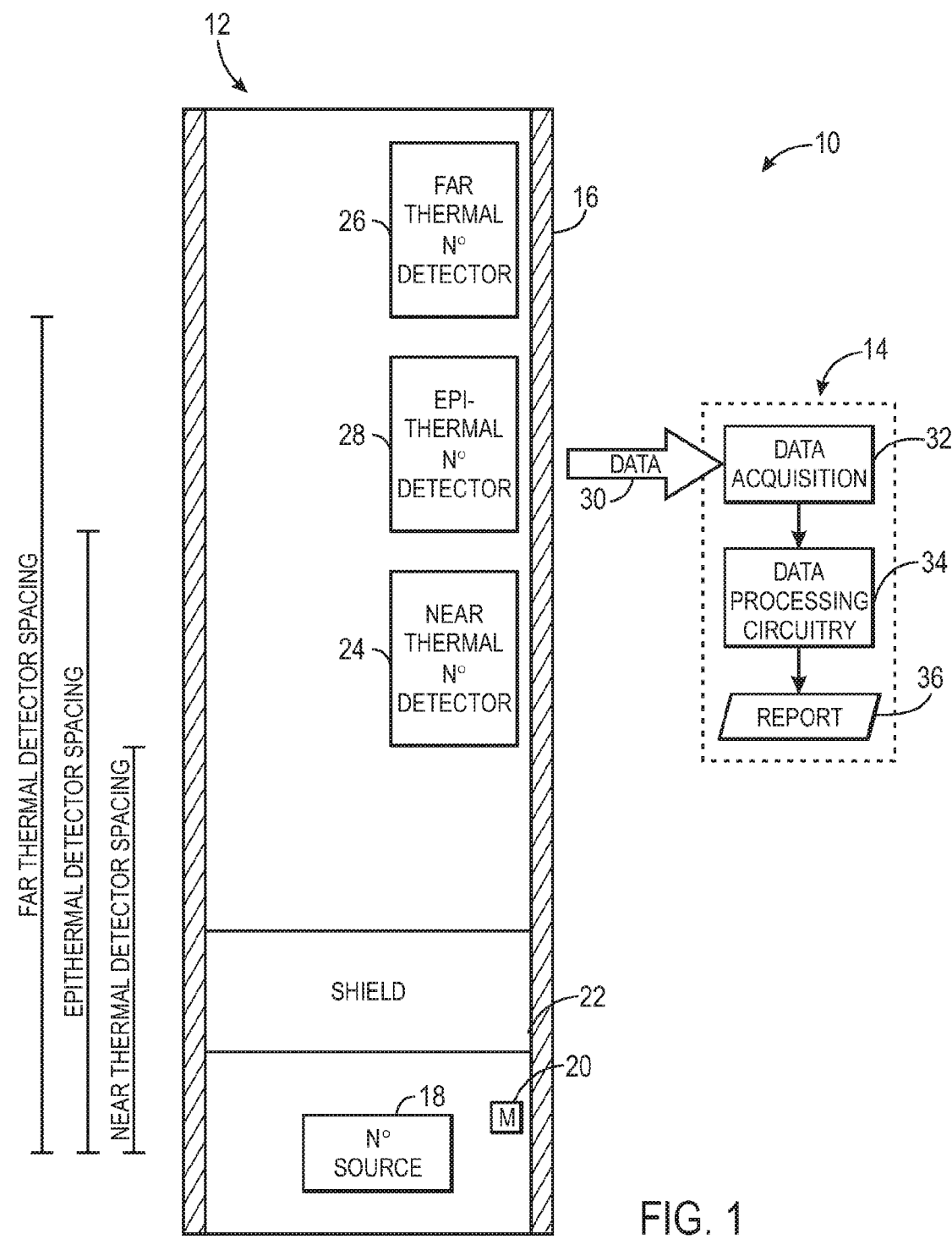
FIG. 1 is a schematic diagram of a neutron well logging system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to matching the lithology effect characteristic to a first thermal neutron porosity device having a lower-energy neutron source using a second thermal neutron porosity device having a higher-energy neutron source using one or more additional neutron detectors in the second device. These additional neutron detectors may be higher-energy neutron detectors, such as epithermal neutron detectors, or may be thermal neutron detectors placed closer to the neutron source to achieve a higher average energy distribution. By way of example, the presently disclosed techniques may be used to match the lithology response associated with a traditional thermal neutron porosity device having an AmBe neutron source when using a "sourceless" thermal neutron porosity device (e.g., a thermal neutron porosity device without a radioisotopic neutron source, such as AmBe) with a higher-energy neutron source. Such a sourceless thermal neutron porosity device may instead generate neutrons using an electronic neutron generator. Also, as used herein, the terms "higher-energy thermal neutron porosity device" or "higher-energy downhole tool" and "lower-energy thermal neutron porosity device" or "lower-energy downhole tool," and similar terms, refer to downhole tools having relatively higher or lower-energy neutron sources. For example, a higher-energy downhole tool may employ a 14 MeV electronic neutron generator while a corresponding lower-energy downhole tool may employ an approximately 4 MeV AmBe radioisotopic source.

As discussed in greater detail below, it is possible for a higher-energy downhole tool to match the lithology effect of a lower-energy downhole tool because, as neutrons emitted by the higher-energy downhole tool scatter and lose energy in a surrounding formation, the neutrons will eventually reach the same energy as those emitted by the lower-energy downhole tool. From this point forward, the neutron scattering processes for both lower-energy and higher-energy devices may be the same. Based on this understanding, the goal of matching the lithology effect of downhole tools having different neutron source energies may be achieved by adding one or more neutron detectors to the higher-energy downhole tool. These neutron detectors may be increased in sensitivity to higher-energy neutrons in at least one of two ways. First, such a neutron detector may be placed closer to the neutron source within the higher-energy downhole tool (e.g., in a position where the average energy of the scattered neutrons may be higher than that at the farthest thermal neutron detector). Second, the neutron detectors that are employed may be selected to have intrinsically higher sensitivities to higher-energy neutrons (e.g., epithermal neutrons).

The presence of at least one neutron detector placed and/or chosen to detect on average higher-energy neutrons in the higher-energy downhole tool makes it possible to account for the initial energy loss of neutrons emitted by the higher-energy downhole tool, to the point where the neutron energy spectrum is more representative of that of the lower-energy downhole tool. From the information offered by detecting these higher-energy neutrons using the higher-energy downhole tool, it may be possible to reconstruct a neutron porosity response equivalent to that of the lower-energy downhole tool. To do so, a correction algorithm, a full inversion, or other mathematical expressions may be applied to information obtained by the higher-energy downhole tool.

With the foregoing in mind, FIG. 1 illustrates a neutron well logging system 10 for determining a porosity of a subterranean formation that exhibits a lithology effect characteristic to a lower-energy downhole tool. The neutron well logging system 10 may include a downhole tool 12 and a data processing system 14. Although the downhole tool 12 and the data processing system 14 are illustrated as separate from one another, the data processing system 14 may be incorporated into the downhole tool 12 in certain embodiments. By way of example, the downhole tool 12 may be a slickline or wireline tool for logging an existing well, or may be installed in a borehole assembly (BHA) for logging while drilling (LWD). In other embodiments, the downhole tool 12 may employ any other suitable mode of conveyance.

The downhole tool 12 may be encased within a housing 16 that houses, among other things, a neutron source 18. The neutron source 18 may include a neutron source capable of emitting relatively high-energy neutrons, such as 14 MeV neutrons. By way of example, the neutron source 18 may be an electronic neutron source, such as a Minitron™ by Schlumberger Technology Corporation, which may produce pulses of neutrons or a continuous stream of neutrons via d-T reactions. Additionally or alternatively, the neutron source 18 may include a radioisotopic source. In any case, the neutron source 18 may emit neutrons of a higher average energy than the neutron source employed by a lower-energy downhole tool whose characteristic lithology effect is to be matched, as discussed further below.

To provide a basis for normalizing the neutron counts detected by other neutron detectors, the downhole tool 12 may include a neutron monitor 20 in certain embodiments. The neutron monitor 20 may measure the output of the neutron source 18. In general, the neutron monitor 20 may be any suitable neutron detector in any suitable configuration within the downhole tool 12 that effectively measures substantially only neutrons emitted by the neutron source 18 that have not been scattered by the surrounding formation. Thus, the neutron monitor 20 may be sensitive only to high-energy neutrons (e.g., of greater than 1 MeV and/or of energy levels emitted by the electronic neutron source 18), may be located very close to the neutron source 18, and/or may be well-shielded from neutrons returning to the downhole tool 12 from the surrounding formation. In some embodiments, the neutron monitor 20 may include a plastic scintillator coupled to a photomultiplier. Such a plastic scintillator may be described by U.S. Pat. No. 6,884,994 to Simonetti et al., assigned to Schlumberger Technology Corporation, which is incorporated by reference herein in its entirety. In other embodiments, the neutron monitor 20 may include other detectors of fast neutrons, such as He-4 gas counters, hydrogen proportional counters, liquid scintillators, or solid state detectors such as SiC or diamond. Moreover, neutron shielding 22 may separate the neutron source 18 from other components of the downhole tool 12.

The downhole tool 12 may include a "near" thermal neutron detector 24 located more closely to the neutron source 18 than a similar "far" thermal neutron detector 26. Additionally, the downhole tool 12 may include at least one neutron detector in a configuration for detecting higher-energy neutrons than at least the far thermal neutron detector 26 detects, such as an epithermal neutron detector 28. Additionally or alternatively, a thermal neutron detector placed closer to the neutron source 18 may detect higher-energy neutrons than at least the far thermal neutron detector 26. Although the following disclosure generally refers to obtaining counts of such higher-energy neutrons using the epithermal neutron detector 28, it should be understood that the higher-energy neutrons may also be obtained using a thermal neutron detector placed close enough to the neutron source 18 to achieve a higher average energy distribution. Thus, when the following discussion refers to the epithermal neutron detector 28, it should be understood to additionally or alternatively refer to a thermal neutron detector placed within the downhole tool 12 so as to achieve a higher average energy distribution.

The near and far thermal neutron detectors 24 and 26 may be relatively insensitive to high energy neutrons, such as those emitted by the neutron source 18. In some embodiments, the neutron detectors 24 and 26 may be $^3$He neutron detectors. The epithermal neutron detector 28 may be a $^3$He neutron detector shielded with cadmium, such that substantially only epithermal neutrons may be detected.

The near thermal neutron detector 24 may have a "near spacing" measured from the neutron source 18 to the face of the active region of the near thermal neutron detector 24 nearest to the neutron source 18, and the far thermal neutron detector 26 may have a "far spacing" measured from the neutron source 18 to the face of the active region of the far neutron detector 26 nearest to the neutron source 18. Similarly, the epithermal neutron detector 28 may have an "epithermal detector spacing" measured from the neutron source 18 to the face of the active region of the epithermal neutron detector 28 nearest to the neutron source 18. In general, the far spacing may be selected such that porosities computed based on the far neutron detector 26 count rate normalized to the neutron monitor 20, or based on a ratio of the far thermal neutron detector 26 to the near thermal neutron detector 24, have a relatively good precision, accuracy, depth of investigation, etc. For example, such a far spacing may be approximately 2 feet. The near neutron detector 22 may have a near spacing of approximately 1 foot. Thus, in the embodiment of the downhole tool 12 illustrated in FIG. 1, the epithermal neutron detector spacing may be a suitable distance between 1 foot and 2 feet.

In certain alternative embodiments, the near spacing may be much closer than many traditional configurations. Indeed, in such embodiments, the near spacing may be chosen such that, at low porosities, many of the neutrons that reach the near neutron detector 22 either directly from the neutron source or after interacting with the subterranean formation, borehole and/or within the device itself have energies too high to detect. At relatively higher porosities, due to the additional scattering off of hydrogen nuclei, the number of lower-energy, detectable neutrons may increase, as the distance the neutrons travel before being slowed to these energies decreases. At higher porosities still, the additional scattering off hydrogen may eventually reduce the number of neutrons of any energy that reach the detector, but not before resulting in a porosity response that is relatively flat or even increasing over part of the porosity range. For a given embodiment of the downhole tool 12, the exact optimal spacing will depend on specific details of the design of the downhole tool 12, including the size and efficiency versus energy of the neutron detector 24, and where, what kind, and how much neutron shielding is used. In some embodiments, the near neutron detector 24 may be spaced such that its porosity response may be relatively flat and/or may increase as porosity increases.

In some embodiments, neutron shielding 22 may be placed between the individual neutron detectors 24, 26, and 28, as well as between the neutron detectors 24, 26, and 28 and the borehole-facing side of the downhole tool 12. These neutron shields 22 may reduce the number of neutrons that may reach the neutron detectors 24, 26, and 28 via the borehole, versus those reaching the detector via the formation, thereby increasing the sensitivity of the downhole tool 12 to formation properties versus those of the borehole.

When the downhole tool is used in a subterranean formation, as generally described in greater detail below, the neutron detectors 24, 26, and 28 may detect a quantity of neutrons that varies depending on the output of the neutron source 18 and the porosity of the formation, among other things. Thus, the responses of the neutron monitor 20 and the neutron detectors 24, 26, and 28 may be transferred as data 30 to the data processing system 14. Based on these responses and a suitable correction, described in greater detail below, the data processing system 14 may determine a porosity of the subterranean formation that matches the lithology effect characteristic of a lower-energy downhole tool, such as a traditional AmBe thermal neutron porosity tool.

The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of present techniques based on specialized software and/or hardware provided as part of the system. Further, the data processing system 14 may include either a single processor or a plurality of processors to facilitate implementation of the presently disclosed functionality. For example, processing may take place at least in part by an embedded processor in the downhole tool 12.

In general, the data processing system 14 may include data acquisition circuitry 32 and data processing circuitry 34. The data processing circuitry 34 may be a microcontroller or microprocessor, such as a central processing unit (CPU), which may execute various routines and processing functions. For example, the data processing circuitry 34 may execute various operating system instructions as well as software routines configured to effect certain processes. These instructions and/or routines may be stored in or provided by an article of manufacture, which may include a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 34 may process data provided as inputs for various routines or software programs, including the data 30.

Such data associated with the present techniques may be stored in, or provided by, a memory or mass storage device of the data processing system 14. Alternatively, such data may be provided to the data processing circuitry 34 of the data processing system 14 via one or more input devices. In one embodiment, data acquisition circuitry 32 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system 14. The network may include various components that facilitate communication, including switches, routers, servers or other computers, network adapters, communications cables, and so forth.

The downhole tool 12 may transmit the data 30 to the data acquisition circuitry 32 of the data processing system 14 via, for example, internal connections within the downhole tool 12 or the downhole tool 12 string, a telemetry system communication to the surface (uplink) through a cable or other means of downhole-to-surface communication, or a communication cable or other communication link that may connect the surface unit to a unit in a different location. After receiving the data 30, the data acquisition circuitry 32 may transmit the data 30 to the data processing circuitry 34. In accordance with one or more stored routines, the data processing circuitry 34 may process the data 30 to ascertain one or more properties of a subterranean formation surrounding the downhole tool 12, such as porosity, that exhibit lithology effects typically associated with a lower-energy downhole tool such as a traditional AmBe thermal neutron porosity device. The data processing circuitry 34 may thereafter output a report 36 indicating the one or more ascertained properties of the formation. The report 36 may be stored in memory or may be provided to an operator via one or more output devices, such as an electronic display and/or a printer.

Figure 2:
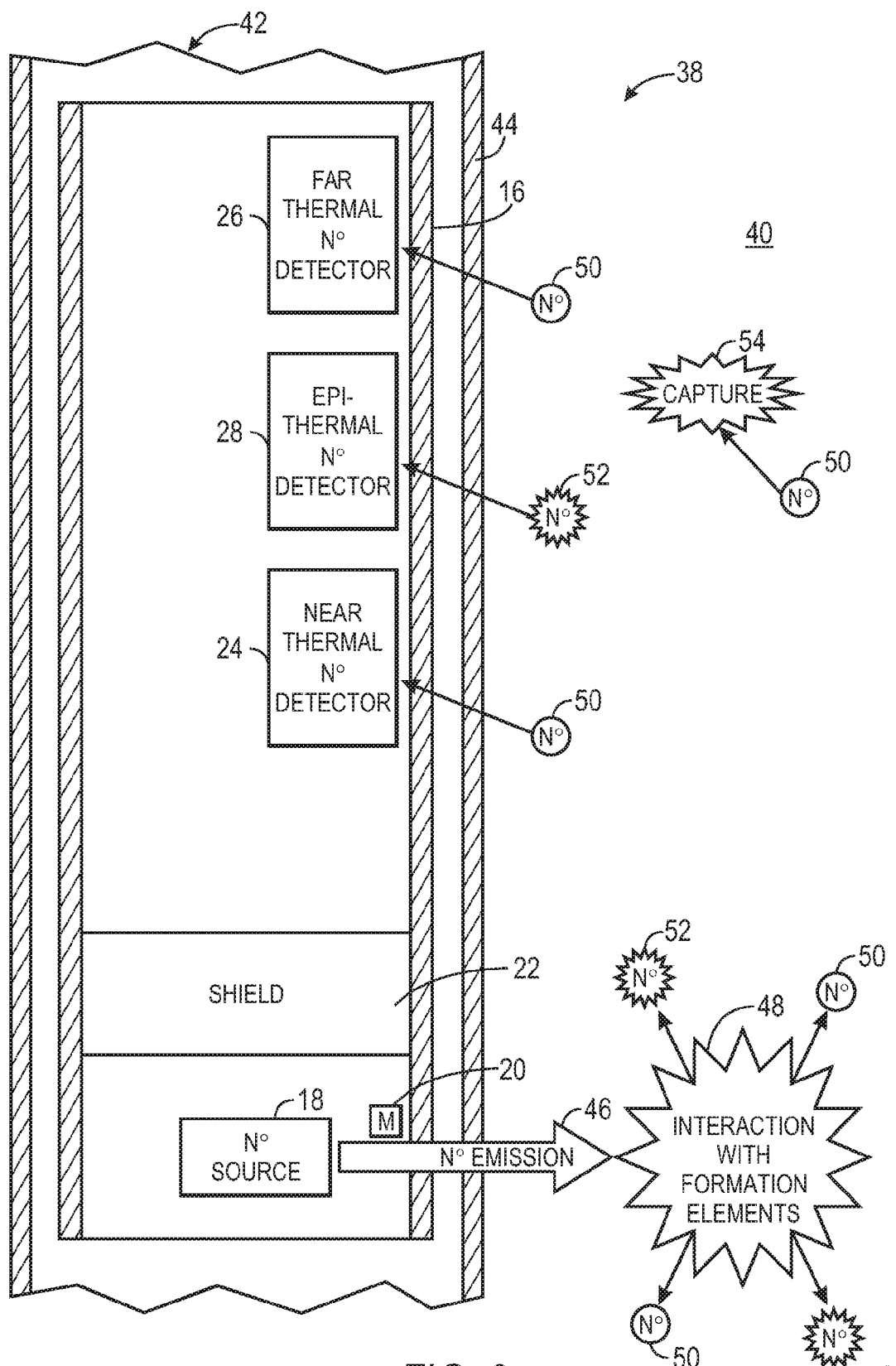
FIG. 2 is a schematic diagram of a neutron well logging operation involving the neutron well logging system of FIG. 1, in accordance with an embodiment.

FIG. 2 represents a well logging operation 38 using the downhole tool 12 to ascertain a porosity of a subterranean formation 40. As illustrated in FIG. 2, the downhole tool 12 may be lowered into a borehole 42 in the subterranean formation 40, which may or may not be cased in a casing 44. After placement into the subterranean formation 40, a neutron emission 46 from the neutron source 18 may have various interactions 48 with elements of the subterranean formation 40 and/or the borehole 42. By way of example, when the neutron source 18 includes an electronic neutron generator, the neutron emission 46 may include a continuous or pulsed neutron burst containing 14 MeV neutrons. The neutron monitor 20 may obtain a count of emitted neutrons that has not substantially interacted with the subterranean formation 40. This count of emitted neutrons, which may be proportional to the total neutron emission 46, may form a basis upon which to normalize counts subsequently obtained by at least the epithermal neutron detector 28.

The interactions 48 of the neutron emission 46 with elements of the subterranean formation 40 and/or the borehole 42 may include, for example, inelastic scattering, elastic scattering, and neutron capture. These interactions 48 may result in neutrons from the neutron emission 46 traveling through the subterranean formation 40 or borehole 42 and reaching the neutron detectors 24, 26, and 28 at lower energies than when first emitted. By way of example, some of the neutrons may lose enough energy to become thermal neutrons 50, detectable to the near and far thermal neutron detectors 24 and/or 26, while others may lose only enough energy such that they are epithermal neutrons 52, detectable to the epithermal neutron detector 28.

Depending on the composition of the subterranean formation 36, the borehole 38, and/or the downhole tool 12 itself, the interactions 44 may vary. For example, hydrogen atoms may cause elastic scattering. Similarly, chlorine atoms found in salt in the subterranean formation 40 or borehole fluid may cause neutron capture events 54 for certain of the thermal neutrons 50 after reducing in energy below approximately 0.1 eV. The numbers and energies of the neutrons 46 that reach the neutron detectors 24 at different distances from the neutron source 18 may thus vary based in part on properties of the subterranean formation 40, including, among other things, a porosity of the subterranean formation 40. Based on a ratio of counts of the thermal neutrons 50 that reach the near and far neutron detectors 24 and 26, or based on a count of the thermal neutrons 50 that reach the far thermal neutron detector 26 normalized to a count of neutrons obtained by the neutron monitor 20, the data processing circuitry 14 may ascertain the porosity of the subterranean formation 40 using any suitable technique.

Moreover, although the downhole tool 12 may have a neutron source 18 that generates relatively high-energy neutron emissions 46, the neutrons of such an emission will eventually reach the average energy of neutrons emitted by a lower-energy downhole tool, such as a traditional AmBe-based thermal neutron porosity device. With such information, based on a count of the epithermal neutrons 52 that reach the epithermal neutron detector 28, the data processing system 14 may adjust the determined porosity to match a lithology effect characteristic of a lower-energy downhole tool 12.

Figure 3:
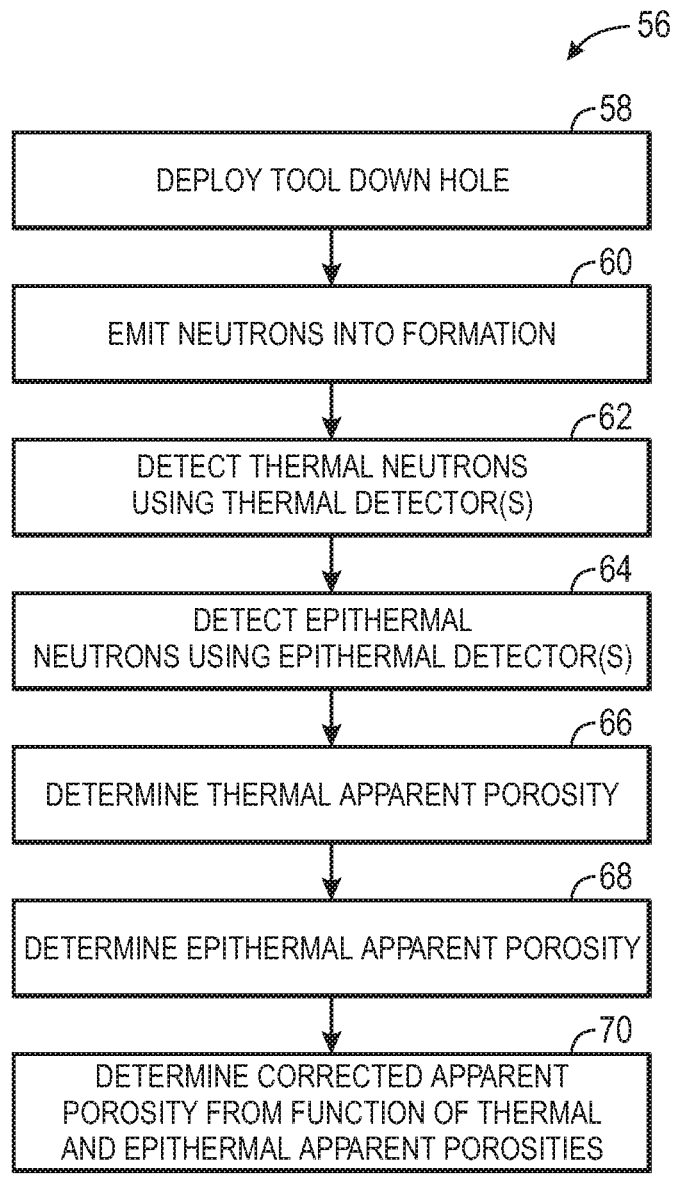
FIG. 3 is a flowchart describing an embodiment of a method for carrying out the neutron well logging operation of FIG. 2.

The operation illustrated in FIG. 2 may be carried out in a variety of ways. For example, a flowchart 56 of FIG. 3 represents an embodiment of a method for obtaining an apparent porosity using the downhole tool 12 that matches an apparent porosity that would be obtained from a lower-energy downhole tool, such as a traditional AmBe neutron porosity tool. In a first step 58, the downhole tool 12 may be deployed into the subterranean formation 40 on a wireline or slickline, or while the borehole 42 is being drilled by a borehole assembly (BHA). In step 60, the neutron source 18 may emit neutrons (illustrated as neutron emission 46 in FIG. 2) into the surrounding formation 40. The neutron emission 46 may take place in bursts of neutrons or as a continuous stream of neutrons. Depending on the interactions 48 of the neutron emission 46 with elements surrounding the downhole tool 12, varying numbers of neutrons of various energies may reach the neutron detectors 24, 26, and/or 28.

In particular, neutrons of the neutron emission 46 that have lost sufficient energy via the interactions 48 may become thermal neutrons 50. These thermal neutrons 50 may be detected, in step 62, by the near thermal neutron detector 24 and/or the far thermal neutron detector 26. However, as noted above, these thermal neutrons 50 may generally be undetectable by the epithermal neutron detector 28. Instead, the epithermal neutron detector 28 may substantially only detect those neutrons from the neutron emission 46 that, after the interactions 48 with surrounding elements, remain epithermal neutrons 52 in step 64.

In step 66, the count rates detected in step 62 may be converted to an apparent thermal neutron ratio porosity $\phi_t$, and in step 68, the count rate detected in step 64 may be converted to a single detector apparent epithermal neutron porosity $\phi_e$ using any suitable techniques for computing porosity. In some embodiments, the epithermal neutron count rate detected in step 64 may be normalized to a count of neutrons from the neutron monitor 20. In step 70, the single-detector apparent epithermal neutron porosity $\phi_e$ and the apparent thermal neutron ratio porosity $\phi_t$ may be employed in a correction function, such as the correction function indicated by the following relationship:

$$\varphi_c = \sum_{i,j} a_{ij} \varphi_e^i \varphi_t^j, \qquad (1)$$

where $\phi_c$ represents a corrected apparent neutron porosity, which is an expected thermal neutron porosity that would be obtained by a traditional thermal neutron porosity device, and the right hand side of equation 1 represents a polynomial in the two apparent porosities $\phi_e$ and $\phi_t$, based on modeling data and/or experimental data. In particular, the coefficients $\alpha_{ij}$, may be chosen to minimize the difference in lithology response between the corrected apparent thermal neutron porosity $\phi_c$ and the apparent porosity of a lower-energy downhole tool, such as a traditional AmBe-based thermal neutron porosity device.

This corrected apparent thermal neutron porosity $\phi_c$ may substantially match the lithology effect of a lower-energy thermal neutron device, such as a traditional AmBe-based thermal neutron porosity device. Although the exact details of the lithology response may depend on certain specific considerations of tool design, such as choice of neutron detector 24, 26, and 28 and the various neutron detector spacings, neutron shielding 22 material choice and placement, and so forth, one comparison between an apparent porosity and a corrected apparent porosity obtained by the downhole tool 12 is provided in FIGS. 4 and 5.

Figure 4:
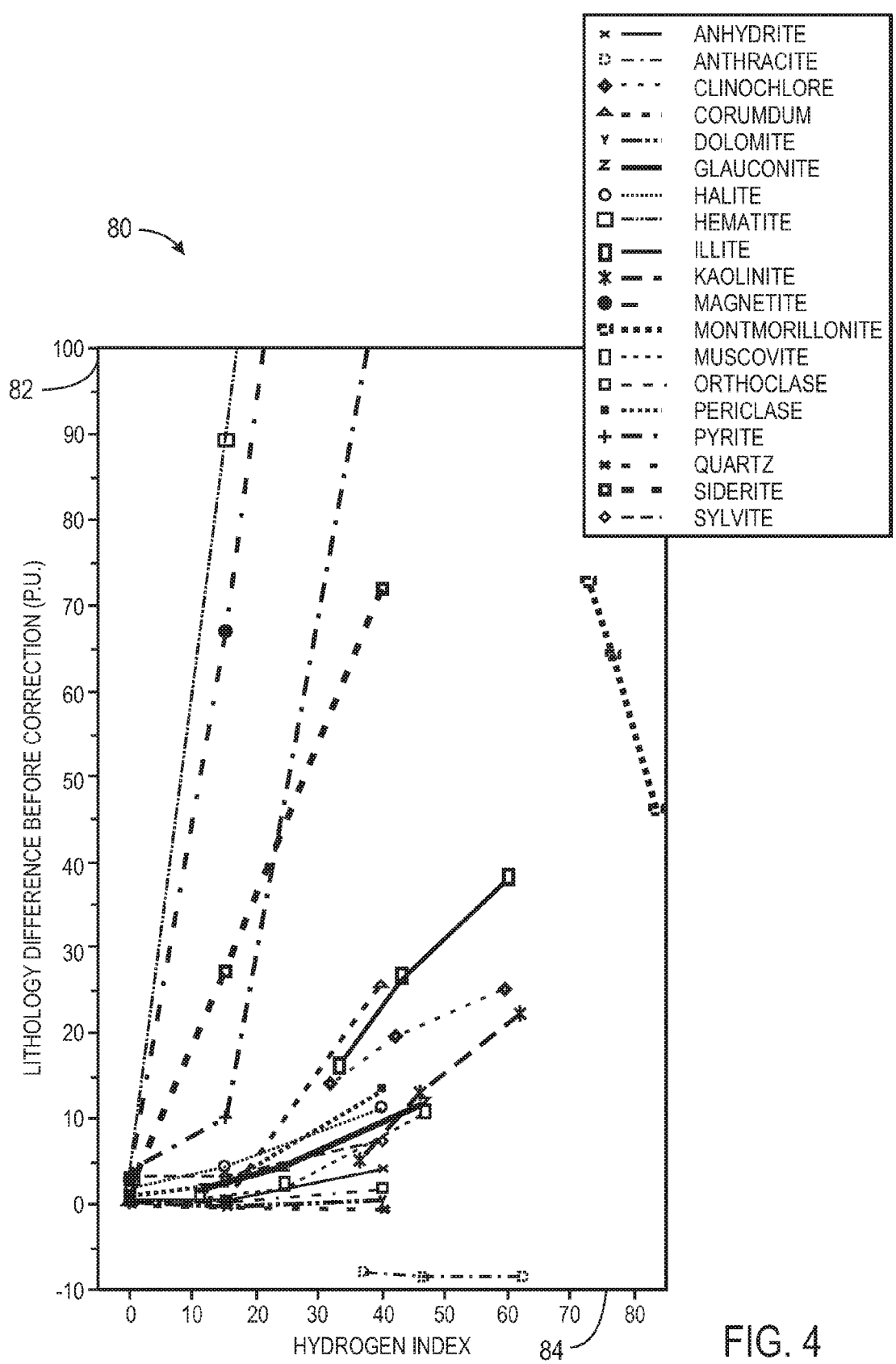
FIG. 4 is a plot illustrating lithology differences between thermal neutron porosity devices employing sources of different energy, in accordance with an embodiment.
Figure 5:
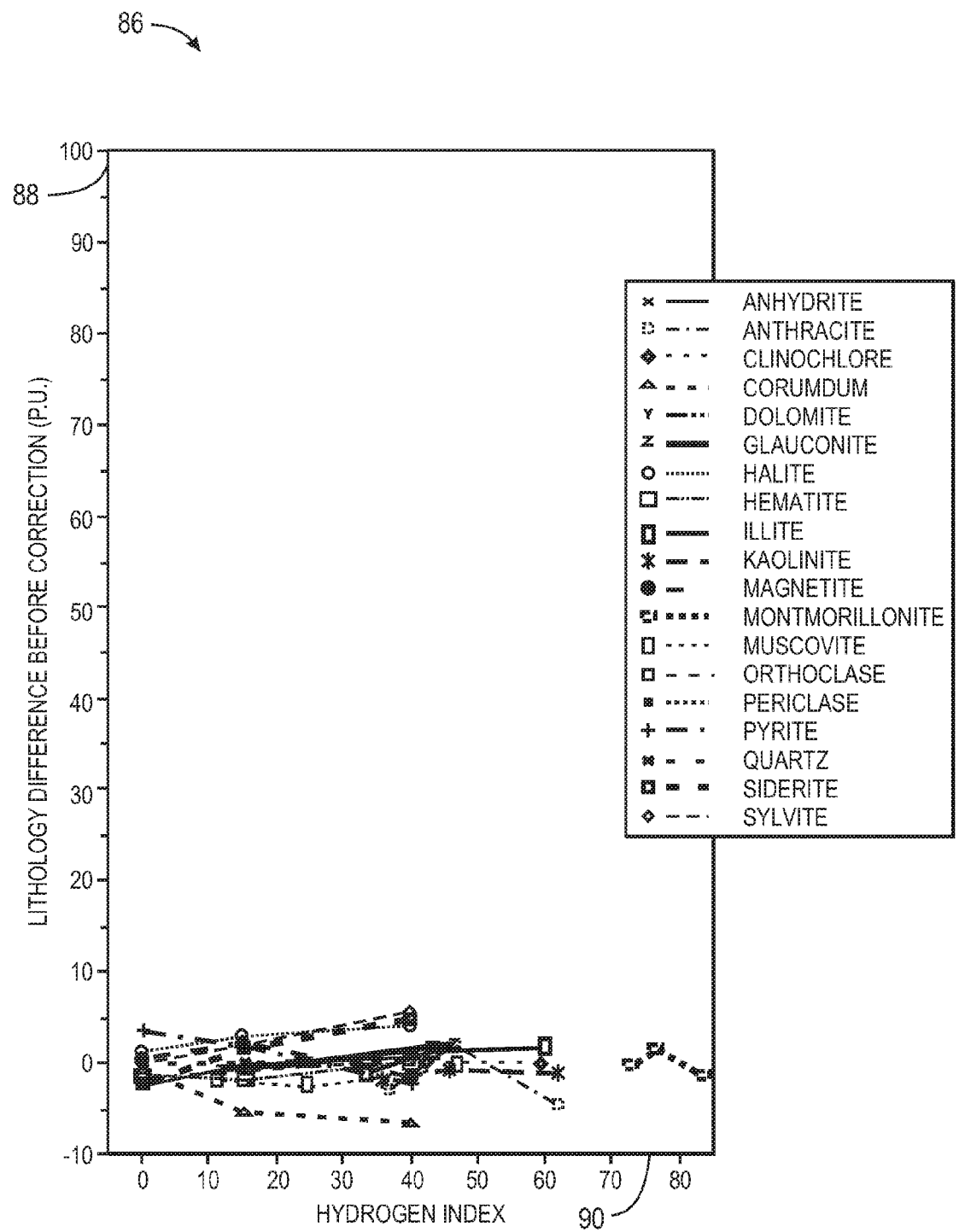
FIG. 5 is a plot illustrating lithology differences between thermal neutron porosity devices with sources of different energies after a correction has been applied, in accordance with an embodiment.

In particular, FIGS. 4 and 5 represent plots comparing the lithology differences between apparent porosities obtained by the downhole tool 12 and apparent porosities obtained by a traditional AmBe-source device. These plots have been modeled using the Monte Carlo N-Particle transport code (MCNP), a leading nuclear Monte Carlo modeling code. Additionally, the downhole tool 12 has been modeled having neutron shields 22 placed between the neutron detectors 24, 26, and 28 and the borehole-facing side of the downhole tool 12. Each of the plots of FIGS. 4 and 5 illustrate lithology differences that may arise when a subterranean formation 40 includes anhydrite, anthracite, clinochlore, corumdum, dolomite, glauconite, halite, hematite, illite, kaolinite, magnetite, montmorillonite, muscovite, orthoclase, periclase, pyrite, quartz, siderite, and/or sylvite, as indicated by a legend associated with each of the plots.

Turning to FIG. 4, a plot 80 represents the lithology difference between the apparent thermal neutron ratio porosity $\phi_t$ obtained by the downhole tool and a similar neutron ratio porosity that would be obtained by a traditional AmBe-based thermal neutron porosity device. An ordinate 82 represents the lithology difference in porosity units (p.u.), and an abscissa 84 represents hydrogen index (p.u.) from zero to approximately 90. As may be appreciated, hydrogen index generally corresponds to porosity but also accounts for H contained in the matrix rock as well as in the pore space. A hydrogen index of 100 p.u. in a given volume indicates that the volume contains as much hydrogen as the same volume of water.

As illustrated in the plot 80 of FIG. 4, the uncorrected apparent thermal neutron ratio porosity $\phi_t$ obtained from the downhole tool 12 may differ significantly from that of a traditional AmBe-based device when certain minerals are present in the subterranean formation 40. These differences may grow increasingly large at higher porosities or hydrogen indices, as shown in the plot 80. While many of the largest deviations in lithology response may arise due to minerals that would not normally occur in hydrocarbon-carrying formations in 100 percent concentrations, the sheer magnitude of these deviations is generally not desirable.

In contrast, as illustrated by a plot 86 of FIG. 5, the lithology difference between a porosity reading from the downhole tool 12 compared to that of a traditional AmBe neutron porosity tool may be substantially reduced when the correction function of Equation (1), or a similar correction function, full inversion, or other mathematical technique, is applied to obtain a corrected apparent porosity $\phi_c$. The plot 86 of FIG. 5 includes an ordinate 88 representing lithology difference in porosity units (p.u.), and an abscissa 90 representing hydrogen index in porosity units (p.u.), from zero to approximately 90. As illustrated in the plot 86, the lithology differences between corrected apparent porosity readings $\phi_c$ and apparent porosities that would be obtained by a traditional AmBe-based thermal neutron porosity device may be substantially improved compared to the uncorrected apparent porosity readings $\phi_t$.

To obtain the data shown in plot 86 of FIG. 5, the coefficients $\alpha_{ij}$ of the correction function, Equation (1), were chosen to minimize the difference in lithology response between the corrected apparent thermal neutron porosity $\phi_c$ and the apparent porosity that would be obtained by an AmBe-based device, according to MCNP modeling of these devices. It should be understood that while functional choices other than the polynomial expressed in Equation (1) are possible, with roughly 50 degrees of freedom remaining in the fit, the difference in lithology response as seen in FIGS. 4 and 5 has been improved by more than an order of magnitude. If additional neutron detectors 28 with different energy sensitivities and/or spacings where employed, one could even better isolate the initial high-energy response of the neutron source 18 of the downhole tool 12 to further improve the fit. Moreover, in certain embodiments, the coefficients $\alpha_{ij}$ may be selected to minimize the difference in lithology response for certain minerals that may be more likely to occur in the subterranean formation 40. Doing so may increase the lithology differences when certain unlikely minerals are present in the formation 40. However, when commonly-occurring minerals are present in the formation 40, the lithology differences between the corrected apparent thermal neutron porosity $\phi_c$ and the apparent porosity that would be obtained by a lower-energy thermal neutron porosity device may be reduced even further.

Figure 6:
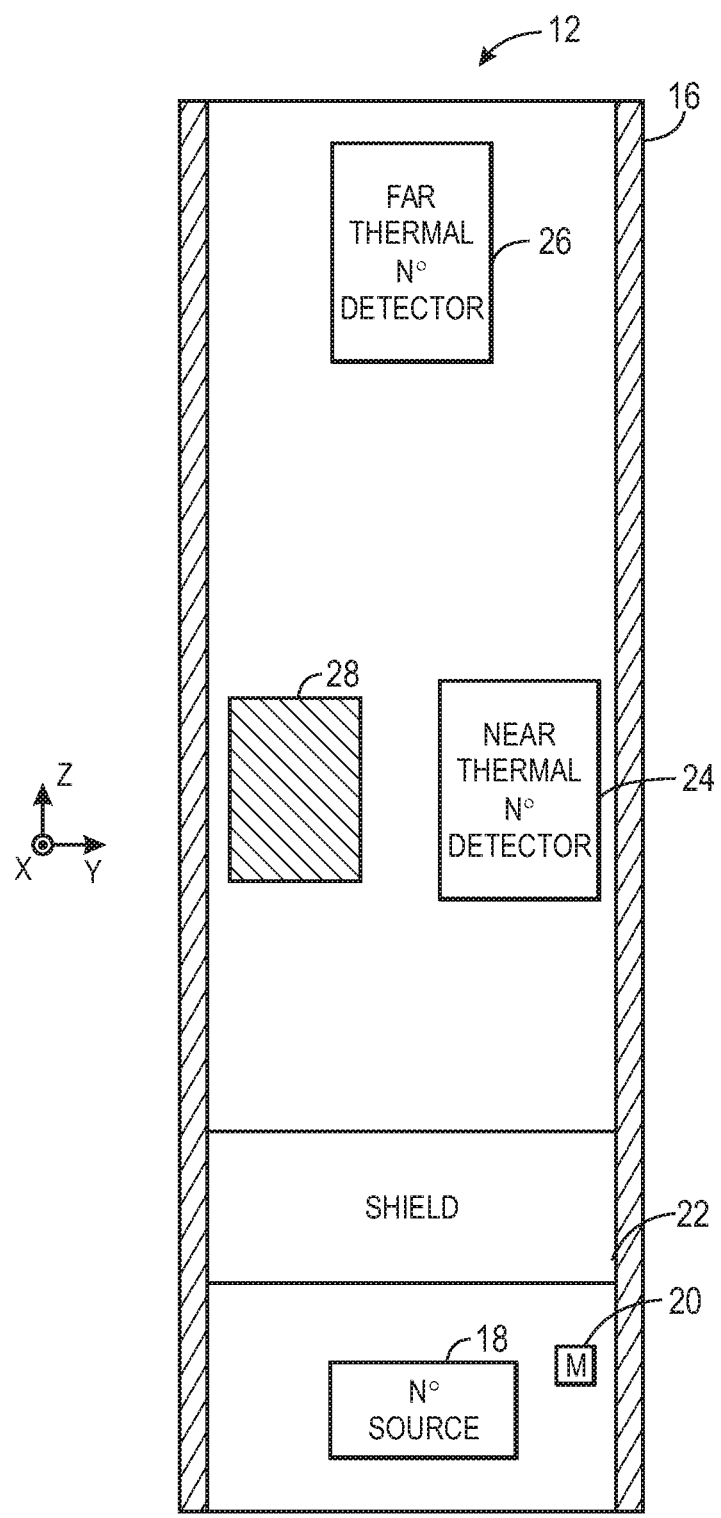
Figure 7:
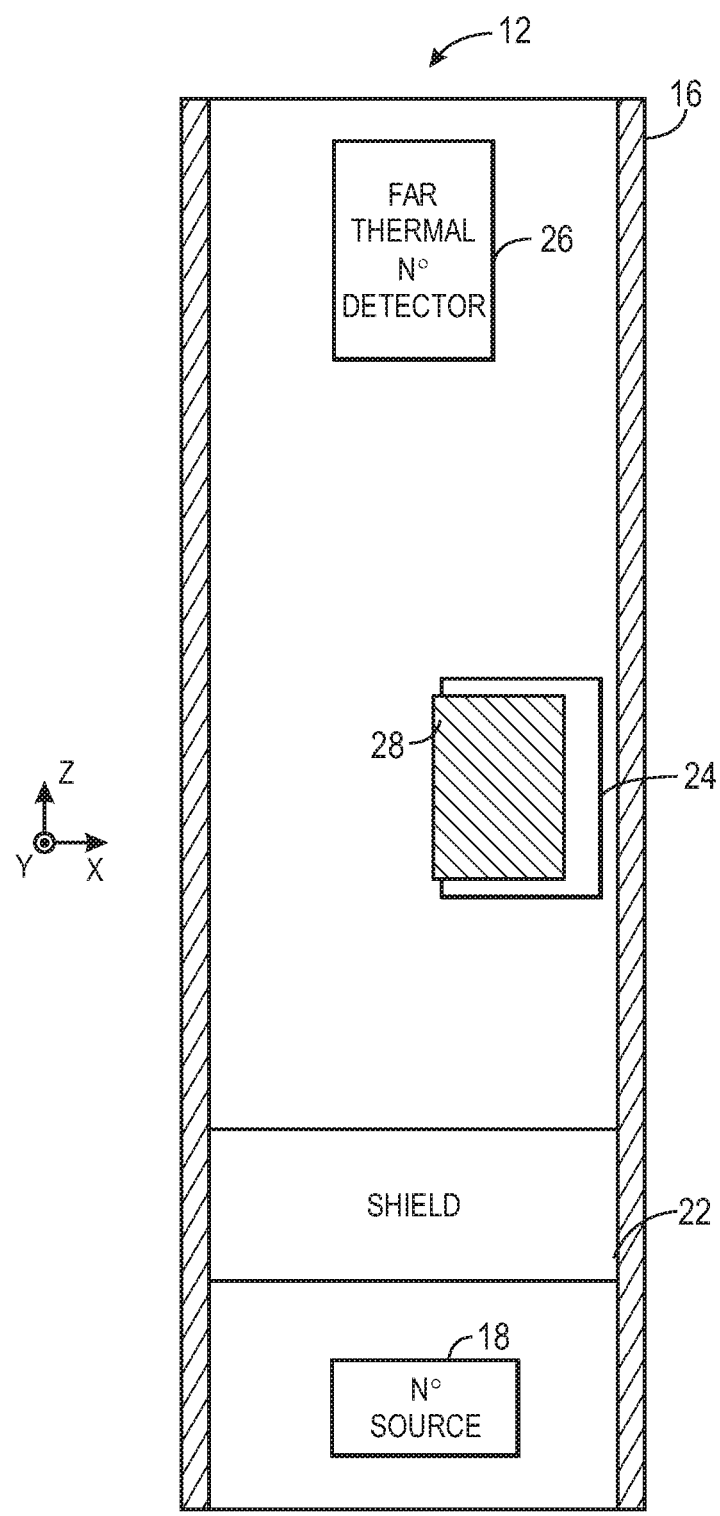

A variety of alternative embodiments of the downhole tool 12 may enable further improvements in the fit that may be obtained by the correction function of Equation (1). These alternative embodiments, represented in FIGS. 6-14, may involve the placement of one or more epithermal neutron detectors 28 in certain configurations within the downhole tool 12. For example, FIGS. 6 and 7 represent an embodiment of the downhole tool 12 in which a higher-energy neutron detector than the thermal neutron detectors 24 and 26, such as the epithermal neutron detector 28, may be disposed axially alongside the near thermal neutron detector 24 (e.g., the two detectors 24 and 28 may at least partially occupy the same space within the downhole tool 12 in the z direction). FIGS. 6 and 7 differ from one another in that in FIG. 7, the downhole tool 12 is rotated by 90 degrees from the position of the downhole tool 12 in FIG. 6.

Except for the placement of the epithermal neutron detector 28 alongside the near thermal neutron detector 24, the embodiment of the downhole tool 12 shown in FIGS. 6 and 7 may be substantially the same as the embodiment of the downhole tool 12 illustrated in FIG. 1. Thus, a neutron monitor 20 may or may not be present near the neutron source 18 to measure the neutron output of the neutron source 18. Similarly, axial shielding 22 may be present between the neutron source 18 and the neutron detectors 24, 26, and 28, as well as between the neutron detectors 24 and 28 and the far thermal neutron detector 26.

Figure 8:
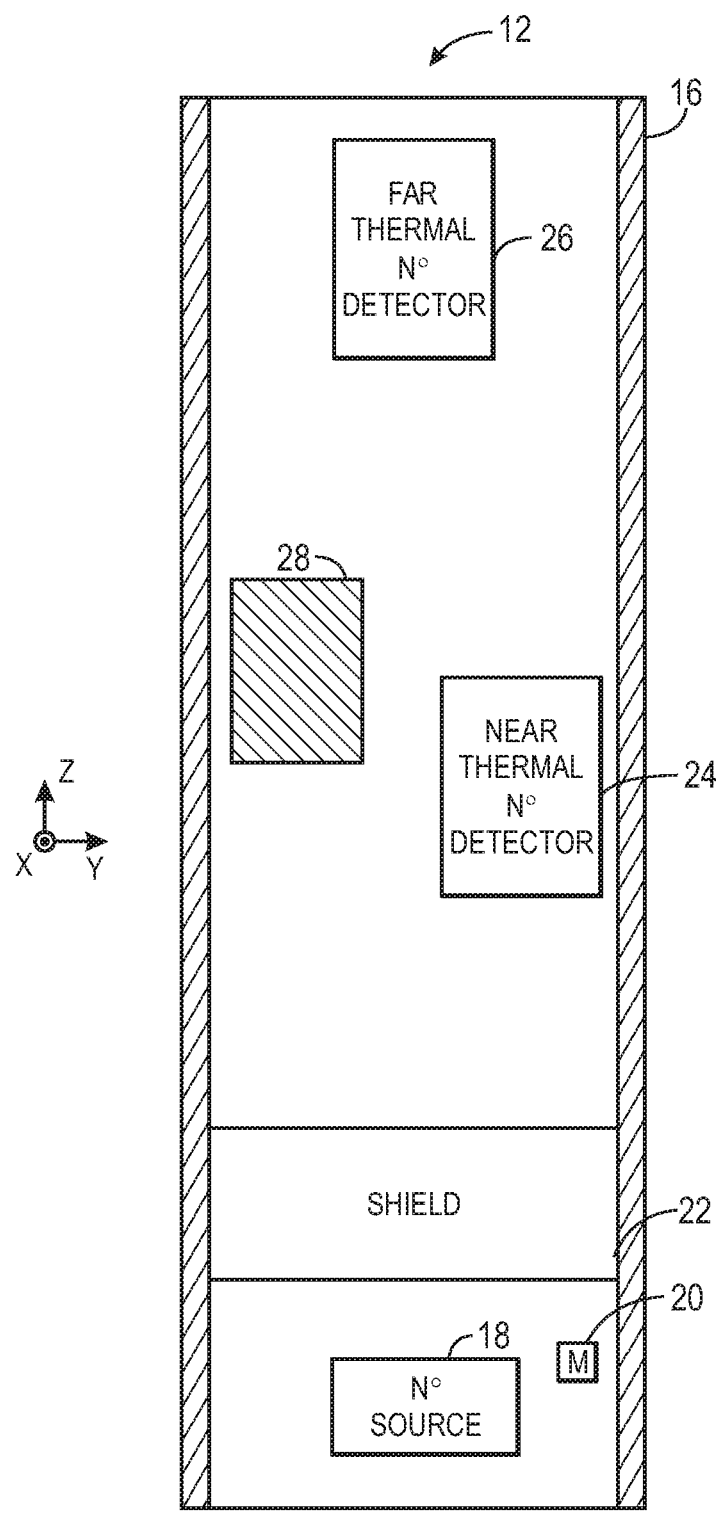
Figure 9:
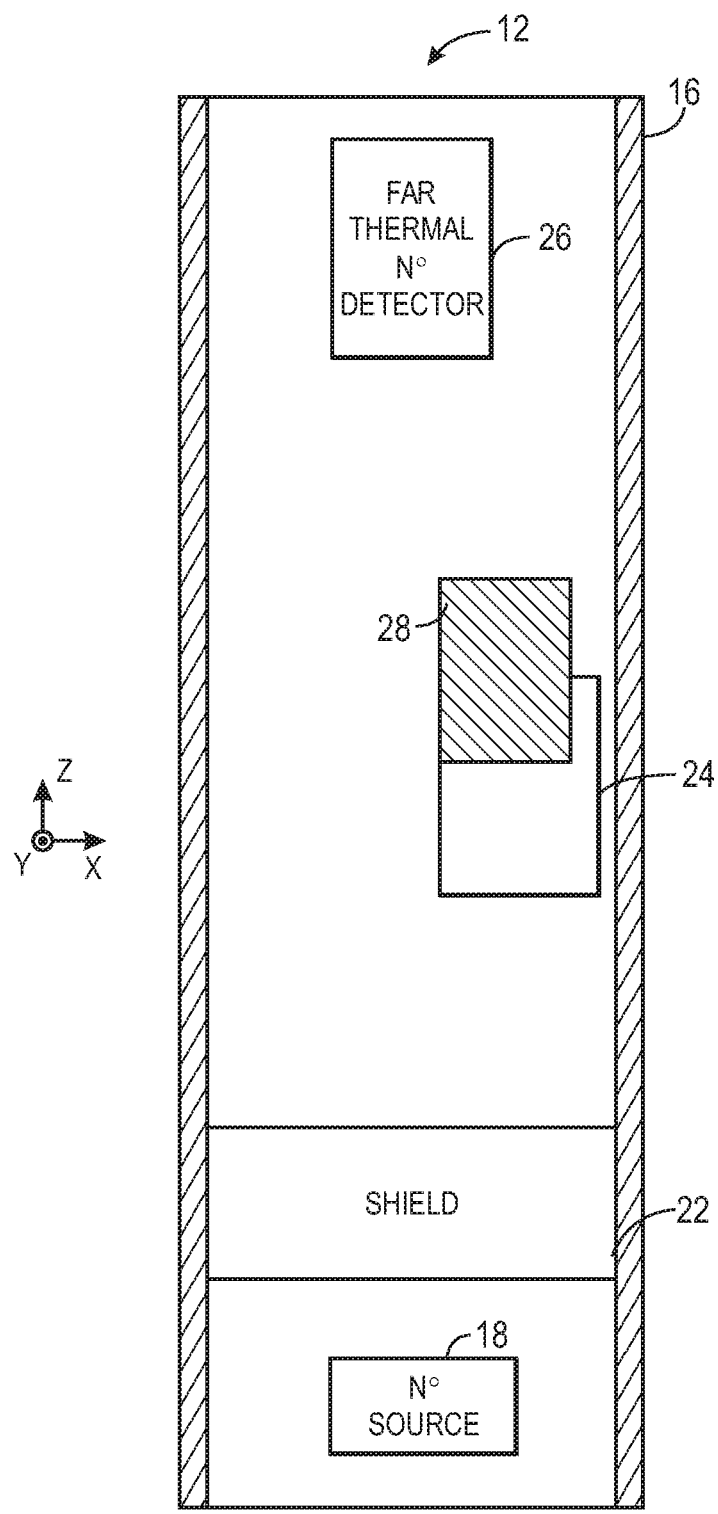

Another embodiment of the downhole tool 12 is shown in FIGS. 8 and 9, in which the higher-energy neutron detector (e.g., epithermal neutron detector 28) is disposed only partly alongside the near thermal neutron detector 24. FIGS. 8 and 9 differ from one another in that in FIG. 9, the downhole tool 12 is rotated by 90 degrees from the position of the downhole tool 12 in FIG. 8. The embodiment of the downhole tool 12 represented by FIGS. 8 and 9 may be substantially the same as or substantially similar to the embodiment of the downhole tool 12 of FIG. 1, except that the epithermal neutron detector 28 may be disposed such that the epithermal neutron detector 28 partially axially overlaps the near thermal neutron detector 24 (e.g., the two detectors 24 and 28 may at least partially occupy the same space within the downhole tool 12 in the z direction). Thus, a neutron monitor 20 may or may not be present near the neutron source 18 to measure the neutron output of the neutron source 18. Similarly, axial shielding 22 may be present between the neutron source 18 and the neutron detectors 24, 26, and 28, as well as between the neutron detectors 24 and 28 and the far thermal neutron detector 26.

Figure 10:
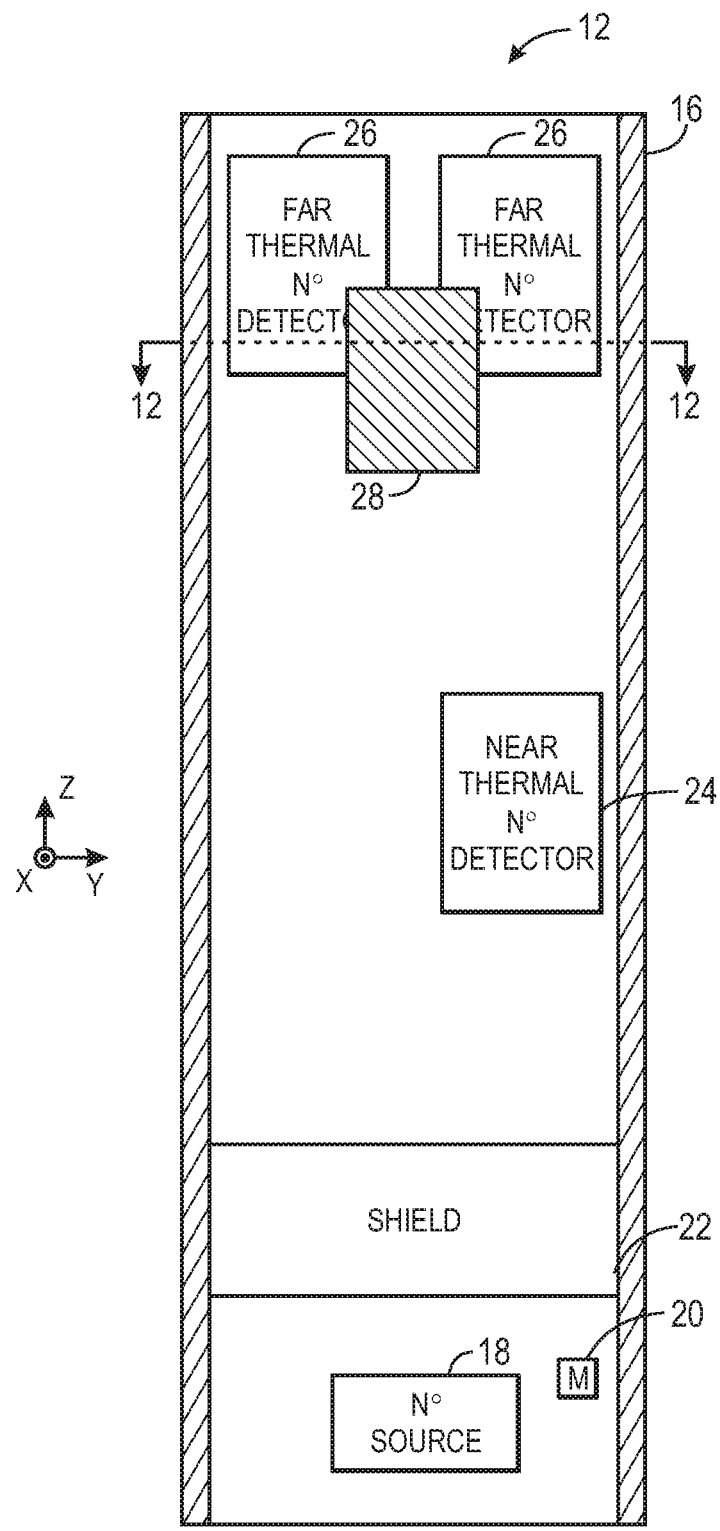

FIGS. 10-12 illustrate an embodiment of the downhole tool 12, in which the higher-energy neutron detector (e.g., epithermal neutron detector 28) may partially axially overlap with one or more far thermal neutron detectors 26. FIGS. 10 and 11 differ from one another in that in FIG. 11, the downhole tool 12 is rotated by 90 degrees from the position of the downhole tool 12 in FIG. 10, and FIG. 12 represents a schematic cross-sectional view at cut lines 12-12 of FIGS. 10 and 11. In the embodiment of FIGS. 10-12, two far thermal neutron detectors 26 may be employed to increase the far thermal neutron detector 26 count rate. Additionally, as illustrated, the epithermal neutron detector 28 may partially axially overlap with the two far thermal neutron detectors 26 (e.g., the neutron detectors 26 and 28 may at least partially occupy the same space within the downhole tool 12 in the z direction). Otherwise, the embodiment of the downhole tool 12 of FIGS. 10-12 may be substantially the same as the embodiment of the downhole tool 12 illustrated in FIG. 1. Thus, a neutron monitor 20 may or may not be present near the neutron source 18 to measure the neutron output of the neutron source 18. Similarly, axial shielding 22 may be present between the neutron source 18 and the neutron detectors 24, 26, and 28, as well as between the near thermal neutron detector 24 and the higher-energy and far thermal neutron detectors 28 and 26.

FIG. 12 represents a schematic cross-sectional view of the embodiment of the downhole tool 12 of FIGS. 10-12 at cut lines 12-12 of FIGS. 10 and 11. The downhole tool 12 is illustrated in place within the casing 44 of a borehole 42. As evident from FIG. 12, at least part of the epithermal neutron detector 28 is disposed alongside the far thermal neutron detectors 26 within the housing 16 of the downhole tool 12 (e.g., the neutron detectors 26 and 28 may at least partially occupy the same space within the downhole tool 12 in the z direction). It should be noted, however, that in the embodiment of the downhole tool 12 of FIGS. 10-12, an active region of the epithermal neutron detector 28 may remain more closely disposed to the neutron source 18 than those of the thermal far neutron detectors 26.

Figure 13:
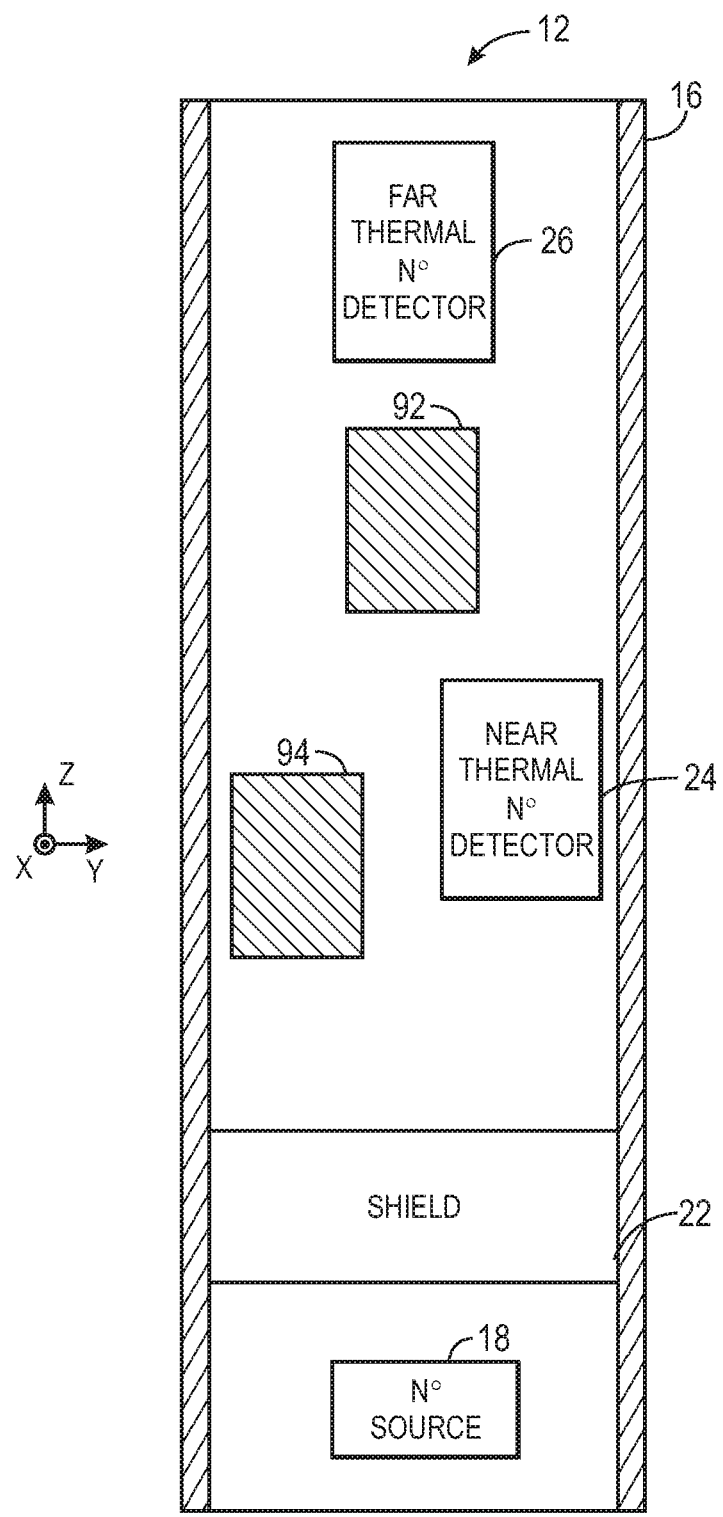
Figure 14:
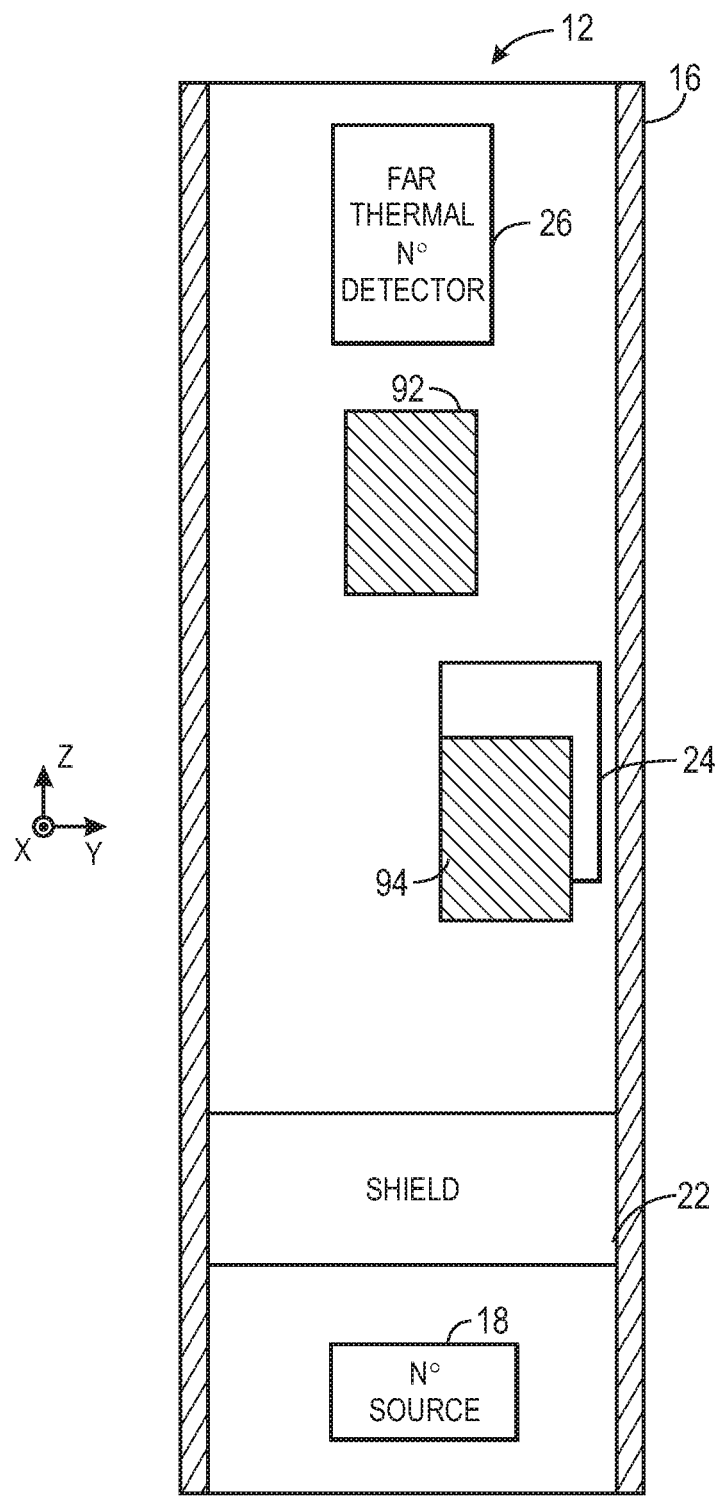

For a more refined correction, two or more detectors of higher energy neutrons, such as the epithermal neutron detector 28, may be employed. By way of example, as illustrated in FIGS. 13 and 14, the downhole tool 12 may include a far epithermal neutron detector 92 disposed a greater distance from the neutron source 18 than a near epithermal neutron detector 94. FIGS. 13 and 14 may differ from one another in that in FIG. 14, the downhole tool 12 is rotated by 90 degrees from the position of the downhole tool 12 in FIG. 13. In the embodiment of the downhole tool 12 of FIGS. 13 and 14, the far epithermal neutron detector 92 may be disposed between the near thermal neutron detector 24 and the far thermal neutron detector 26. The near epithermal neutron detector 94 may be disposed partially axially alongside the near thermal neutron detector 24, but may be disposed slightly more closely to or farther from the neutron source 18 (e.g., the neutron detectors 24 and 94 may at least partially occupy the same space within the downhole tool 12 in the z direction).

In alternative embodiments, the epithermal neutron detectors 92 and 94 may be disposed elsewhere (e.g., the far epithermal neutron detector 92 may be disposed at least partially axially alongside the one or more far thermal neutron detectors 26 and/or the near epithermal detector 94 may be disposed farther from the neutron source 18 than the near thermal detector 24 but closer to the neutron source 18 than the far epithermal detector 92). However, in these alternative embodiments, an active region of the far epithermal neutron detector 92 may generally remain closer than that of the far thermal neutron detector 26. Also, in some embodiments, the far and near epithermal neutron detectors 92 and 94 may be spaced so as to sufficiently enable the determination of a ratio apparent epithermal neutron porosity from epithermal neutron counts by the detectors 92 and 94.

It should be noted that embodiments of the present disclosure should not be limited to involve only the use of two thermal neutron detectors 24 and 26. Indeed, in one case, the lithology effects characteristic of a single neutron detector of a lower-energy downhole tool, whether epithermal or thermal, could be matched in a higher-energy downhole tool using two side-by-side detectors, in which one such neutron detector is capable of detecting higher-energy neutrons than the other. Further optimization of the neutron response of any higher-energy downhole tool, such as the downhole tool 12, may be possible by employing thermal neutron detectors in more than two axial positions.

Additionally or alternatively, certain embodiments may involve placing certain neutron detectors on different axial sides of the neutron source 18 within the higher-energy downhole tool. Such a configuration may be employed to improve neutron detector positioning, shielding, and response optimization. Moreover, the embodiments disclosed herein should not be understood as limited to reproducing the response of an AmBe-based thermal neutron porosity tool. Indeed, the response of any thermal neutron porosity tool employing any suitable lower-energy neutron source, such as $^{252}$Cf may also be reproduced using these methods The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
    deploying a first downhole tool into a subterranean formation;
    emitting neutrons of a first average energy into the subterranean formation using a first neutron source of the first downhole tool;
    detecting a first count of neutrons that have scattered off the subterranean formation and have lost energy to reach thermal energies using a thermal neutron detector of the first downhole tool;
    detecting a second count of neutrons that have scattered off the subterranean formation and have lost energy to reach epithermal energies using an epithermal neutron detector of the first downhole tool;
    determining a first apparent porosity of the subterranean formation based at least in part on the first count of neutrons using data processing circuitry;
    determining a second apparent porosity of the subterranean formation based at least in part on the second count of neutrons using the data processing circuitry; and
    determining a corrected apparent porosity of the subterranean formation based at least in part on the first apparent porosity and the second apparent porosity, wherein the corrected apparent porosity has a lithology effect characteristic of a second downhole tool having a second neutron source configured to emit neutrons of a second average energy, wherein the second average energy is lower than the first average energy by at least 1 MeV.

2. The method of claim 1, wherein the corrected apparent porosity is determined based at least in part on a correction function of at least the second apparent porosity.

3. The method of claim 1, wherein the corrected apparent porosity is determined by applying a correction function to a combination of the first apparent porosity and the second apparent porosity.

4. The method of claim 3, wherein the correction function comprises a polynomial having coefficients chosen to minimize a difference in lithology effect between the corrected apparent porosity and a third apparent porosity, wherein the third apparent porosity is determined experimentally using the second downhole tool.

5. The method of claim 3, wherein the correction function comprises a polynomial having coefficients chosen to minimize a difference in lithology effect between the corrected apparent porosity and a third apparent porosity, wherein the third apparent porosity is determined based on computer modeling of the second downhole tool.

6. The method of claim 1, comprising determining a third count of neutrons that have scattered off the subterranean formation and have lost energy to reach thermal energies using another thermal neutron detector of the first downhole tool, wherein the first apparent porosity is determined based at least in part on a ratio of the first count of neutrons to the third count of neutrons.

7. The method of claim 1, comprising detecting a count of neutrons proportional to the neutrons emitted by the first neutron source using a neutron monitor of the first downhole tool, wherein the second apparent porosity is determined based at least in part on a normalized second count of neutrons, wherein the normalized second count of neutrons is determined by normalizing the second count of neutrons to the count of neutrons proportional to the neutrons emitted by the first neutron source.

8. A system comprising:
    a downhole neutron porosity device configured to emit neutrons of a first average energy into a subterranean formation using an electronic neutron generator and to detect counts of neutrons that scatter off the subterranean formation using at least one thermal neutron detector and at least one epithermal neutron detector; and
    data processing circuitry configured to determine an apparent porosity of the subterranean formation based at least in part on the detected counts of neutrons, wherein the apparent porosity substantially matches an expected porosity that would be obtained using a radioisotopic downhole neutron porosity device configured to emit neutrons of a second average energy using a radioisotopic neutron source, wherein the second average energy is lower than the first average energy.

9. The system of claim 8, wherein the electronic neutron generator is configured to generate neutrons based on deuterium-tritium reactions, deuterium-deuterium reactions, or tritium-tritium reactions, or any combination thereof.

10. The system of claim 8, wherein the radioisotopic neutron source comprises AmBe or $^{225}$Cf, or a combination thereof.

11. The system of claim 8, wherein the first average energy is greater than approximately 4 MeV and the second average energy is less than approximately 14 MeV.

12. The system of claim 8, wherein the second average energy is less than approximately 14 MeV and the second average energy is approximately 14 MeV.

13. A downhole neutron porosity tool comprising:
    an electronic neutron generator configured to emit neutrons into a subterranean formation;
    a thermal near neutron detector configured to detect a first count rate of thermal neutrons scattered off the subterranean formation, wherein a front face of an active region of the thermal near neutron detector is disposed at a near spacing from the electronic neutron generator;
    a thermal far neutron detector configured to detect a second count rate of thermal neutrons scattered off the subterranean formation, wherein a front face of an active region of the thermal far neutron detector is disposed a far spacing from the electronic neutron generator, wherein the far spacing is greater than the near spacing;

an epithermal neutron detector configured to detect a count rate of epithermal neutrons scattered off the subterranean formation; and data processing circuitry configured to determine a porosity of the subterranean formation based at least in part on the first count rate of thermal neutrons, the second count rate of thermal neutrons, and the count rate of epithermal neutrons, wherein the determined porosity has a lithology effect that substantially matches another lithology effect associated with another downhole neutron porosity tool that employs a lower-energy neutron source that emits neutrons having an average energy that is at least 1 MeV lower than an average energy of the neutrons emitted by the electronic neutron generator.

14. The downhole tool of claim 13, wherein a front face of an active region of the epithermal neutron detector is disposed at a spacing between the near spacing and the far spacing.

15. The downhole tool of claim 13, wherein the epithermal neutron detector is disposed approximately the same distance from the electronic neutron generator as the thermal near neutron detector.

16. The downhole tool of claim 13, wherein the epithermal neutron detector is disposed so as to at least partially overlap a region of the thermal near neutron detector in a direction aligned with an axis of the downhole tool.

17. The downhole tool of claim 13, wherein the epithermal neutron detector is disposed so as to at least partially overlap a region of the thermal far neutron detector in a direction aligned with an axis of the downhole tool.

18. The downhole tool of claim 13, comprising another neutron detector disposed alongside the thermal far neutron detector, the thermal near neutron detector, or the epithermal neutron detector in a direction aligned with an axis of the downhole tool, wherein the other neutron detector is configured to supplement the first count rate of thermal neutrons, the second count rate of thermal neutrons, or the count rate of epithermal neutrons.

19. The downhole tool of claim 13, comprising a neutron monitor configured to detect a count rate of neutrons emitted by the electronic neutron generator, wherein the data processing circuitry is configured to determine the porosity of the subterranean formation based at least in part on the count rate of epithermal neutrons normalized to the count rate of neutrons emitted by the electronic neutron generator.

20. The downhole tool of claim 13, comprising another epithermal neutron detector configured to detect another count rate of epithermal neutrons scattered off the subterranean formation, wherein the data processing circuitry is configured to determine the porosity of the subterranean formation based at least in part on a ratio of the count rate of epithermal neutrons and the other count rate of epithermal neutrons.

* * * * *